US012777343B2

(12) United States Patent
Albert et al.

(10) Patent No.: US 12,777,343 B2
(45) Date of Patent: Oct. 27, 2026

(54) PARAMETER OPTIMIZATION IN CELLULAR NETWORKS

(71) Applicant: Samsung Electronics Co., Ltd., Suwon-si (KR)

(72) Inventors: Samuel Albert, Robbinsville, NJ (US); Yan Xin, Princeton, NJ (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/408,462

(22) Filed: Jan. 9, 2024

(65) Prior Publication Data

US 2024/0334203 A1 Oct. 3, 2024

Related U.S. Application Data

(60) Provisional application No. 63/455,892, filed on Mar. 30, 2023.

(51) Int. Cl.
*H04W 24/02* (2009.01)

(52) U.S. Cl.
CPC .................................. *H04W 24/02* (2013.01)

(58) Field of Classification Search
CPC .............................. H04W 24/02; H04W 24/04
USPC ....................................................... 455/422.1
See application file for complete search history.

(56) References Cited

U.S. PATENT DOCUMENTS

| | | | |
|---|---|---|---|
| 10,681,566 | B2 | 6/2020 | Sanneck et al. |
| 10,735,287 | B1 | 8/2020 | Soundrarajan |
| 10,785,101 | B2 | 9/2020 | Li et al. |
| 11,424,991 | B2 | 8/2022 | Adhav et al. |
| 11,496,353 | B2 | 11/2022 | Chandrasekhar et al. |
| 2016/0381580 | A1 * | 12/2016 | Kwan .................. H04W 24/08 370/252 |
| 2021/0351973 | A1 | 11/2021 | Ford et al. |
| 2023/0047057 | A1 | 2/2023 | Kurt et al. |
| 2023/0216737 | A1 | 7/2023 | Borsos et al. |
| 2024/0224065 | A1 | 7/2024 | Xin et al. |

OTHER PUBLICATIONS

"2019 Annual Report", AT&T Inc., Feb. 2020, 107 pages.
"Small cells market status report", Small Cell Forum, Document No. 050.10.03, Dec. 2018, 22 pages.

(Continued)

*Primary Examiner* — Huy C Ho

(57) ABSTRACT

A method includes partitioning a set of configuration management (CM) data for one or more cellular network devices into multiple distinct time intervals. The method also includes determining one or more temporal points of interest in each time interval based on whether CM changes exist during that time interval. The method also includes, for each temporal point of interest in each time interval, identifying a first set of data samples before that temporal point of interest and a second set of data samples after that temporal point of interest, and averaging features and a target key performance indicator (KPI) in the first set of data samples and in the second set of data samples. The method also includes performing regression analysis to determine an impact of the features on the target KPI.

20 Claims, 11 Drawing Sheets

(56) References Cited

OTHER PUBLICATIONS

Wikipedia, "Coefficient of determination", downloaded Jul. 8, 2022, 13 pgs. https://en.wikipedia.org/wiki/Coefficient_of_determination.
Wikipedia, "Welch's t-test", downloaded Jul. 8, 2022, 4 pgs. https://en.wikipedia.org/wiki/Welch's_t-test.
Engineering Statistics Handbook, "1.3.5.3. Two-Sample t-Test for Equal Means", downloaded Jul. 8, 2022, 4 pgs. https://www.itl.nist.gov/div898/handbook/eda/section3/eda353.htm.
Wikipedia, "Kullback-Leibler divergence", downloaded Jul. 8, 2022, 21 pgs. https://en.wikipedia.org/wiki/Kullback-Leibler_divergence.
Wikipedia, "F-score", downloaded Dec. 5, 2023, 7 pgs. https://en.wikipedia.org/wiki/F-score.
GitHub, "JuliaAI/DecisionTree.jl: Julia implementation of Decision Tree (CART) and Random Forest algorithms", downloaded Jul. 8, 2022, 10 pgs. https://github.com/JuliaAI/DecisionTree.jl.
GitHub, "avik-pal/Lux.jl: Explicitly Parameterized Neural Networks in Julia", downloaded Jul. 8, 2022, 4 pgs. https://github.com/LuxDL/Lux.jl.

* cited by examiner

PARAMETER OPTIMIZATION IN CELLULAR NETWORKS

CROSS-REFERENCE TO RELATED APPLICATIONS AND CLAIM OF PRIORITY

The present application claims priority to U.S. Provisional Patent Application No. 63/455,892 filed on Mar. 30, 2023. The content of the above-identified patent document is incorporated herein by reference.

TECHNICAL FIELD

This disclosure relates generally to wireless communications systems. Embodiments of this disclosure relate to methods and apparatuses for parameter optimization in cellular networks.

BACKGROUND

The operation and management of existing cellular networks pose significant challenges due to their size and complexity, resulting in high operating expenditure (OPEX) for cellular service providers. In cellular networks, a large volume of network data is generated by network devices such as base stations, core network elements, and end-user devices. This network data can include Performance Management (PM) data, Fault Management (FM) data, and Configuration Management (CM) data. To maintain good service quality for end-users, operators should continuously monitor network performance benchmarks, such as Key Performance Indicators (KPIs) and Key Quality Indicators (KQIs), across thousands of base stations and other devices in the network.

SUMMARY

Embodiments of the present disclosure provide methods and apparatuses for parameter optimization in cellular networks.

In one embodiment, a method includes partitioning a set of configuration management (CM) data for one or more cellular network devices into multiple distinct time intervals. The method also includes determining one or more temporal points of interest in each time interval based on whether CM changes exist during that time interval. The method also includes, for each temporal point of interest in each time interval, identifying a first set of data samples before that temporal point of interest and a second set of data samples after that temporal point of interest, and averaging features and a target key performance indicator (KPI) in the first set of data samples and in the second set of data samples. The method also includes performing regression analysis to determine an impact of the features on the target KPI.

In another embodiment, a device includes a transceiver and a processor operably connected to the transceiver. The processor is configured to: partition a set of CM data for one or more cellular network devices into multiple distinct time intervals; determine one or more temporal points of interest in each time interval based on whether CM changes exist during that time interval; for each temporal point of interest in each time interval, identify a first set of data samples before that temporal point of interest and a second set of data samples after that temporal point of interest, and average features and a target KPI in the first set of data samples and in the second set of data samples; and perform regression analysis to determine an impact of the features on the target KPI.

In another embodiment, a non-transitory computer readable medium includes program code that, when executed by a processor of a device, causes the device to: partition a set of CM data for one or more cellular network devices into multiple distinct time intervals; determine one or more temporal points of interest in each time interval based on whether CM changes exist during that time interval; for each temporal point of interest in each time interval, identify a first set of data samples before that temporal point of interest and a second set of data samples after that temporal point of interest, and average features and a target KPI in the first set of data samples and in the second set of data samples; and perform regression analysis to determine an impact of the features on the target KPI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
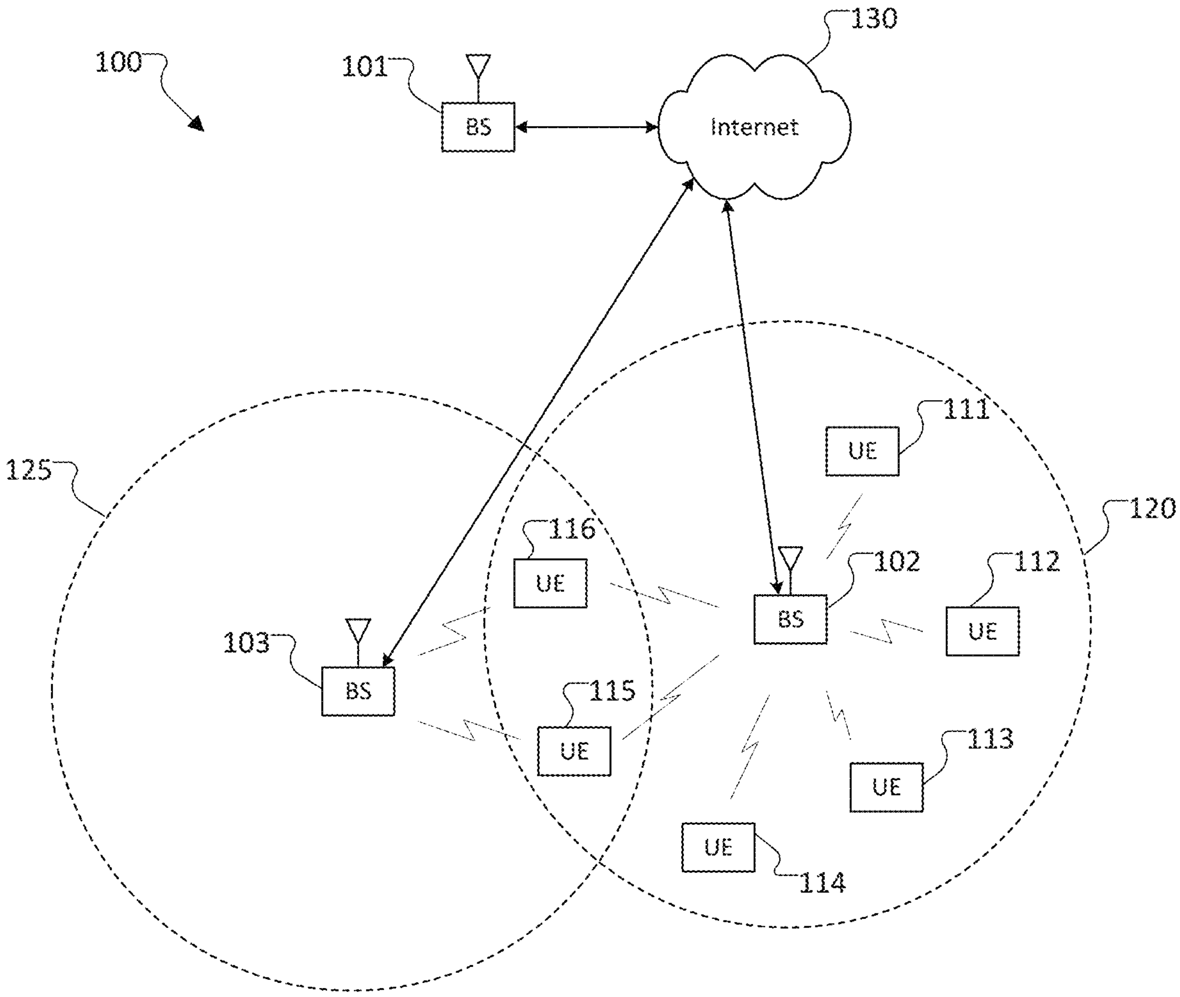
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
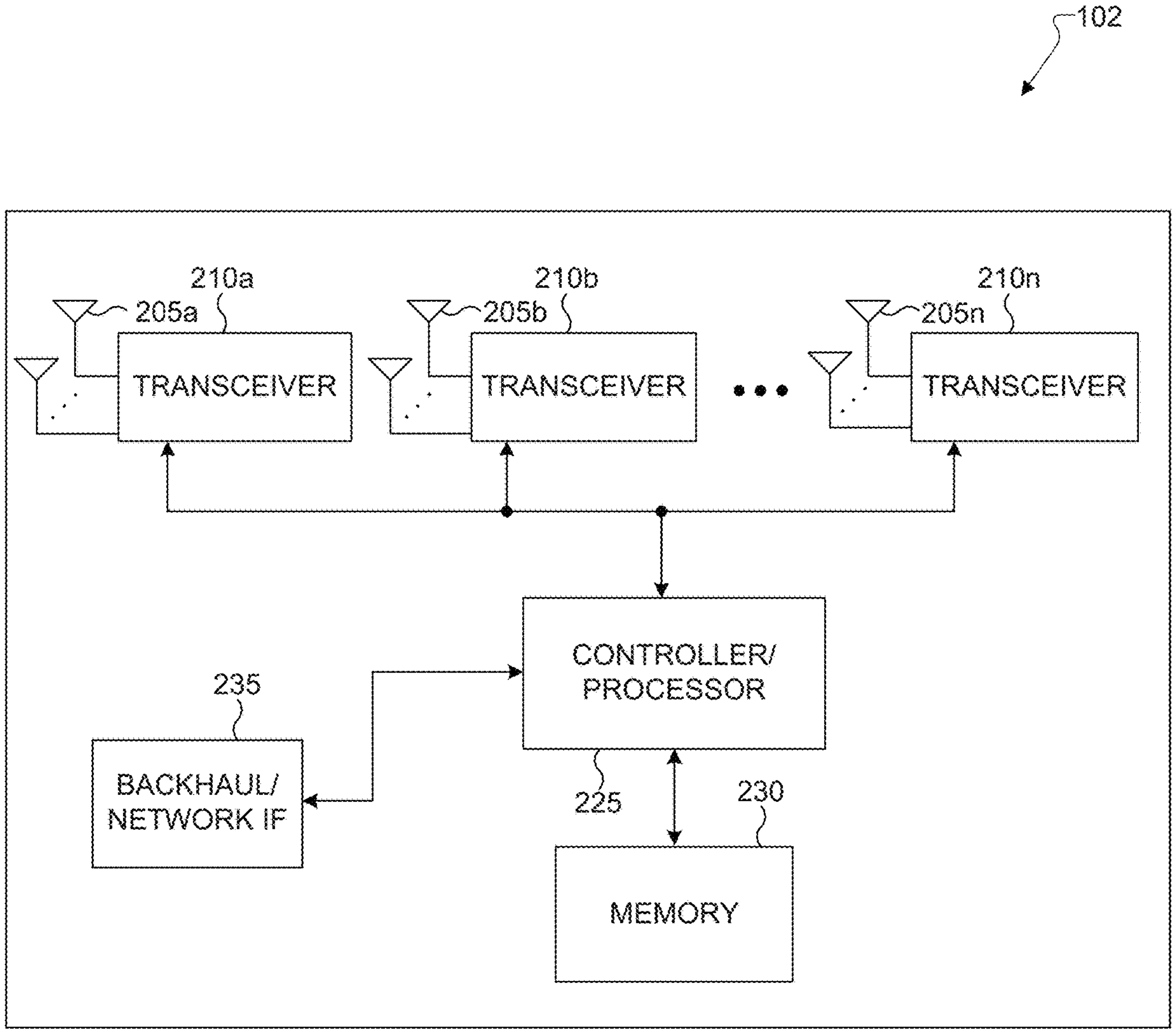
FIG. 2 illustrates an example gNB according to various embodiments of the present disclosure.
Figure 3:
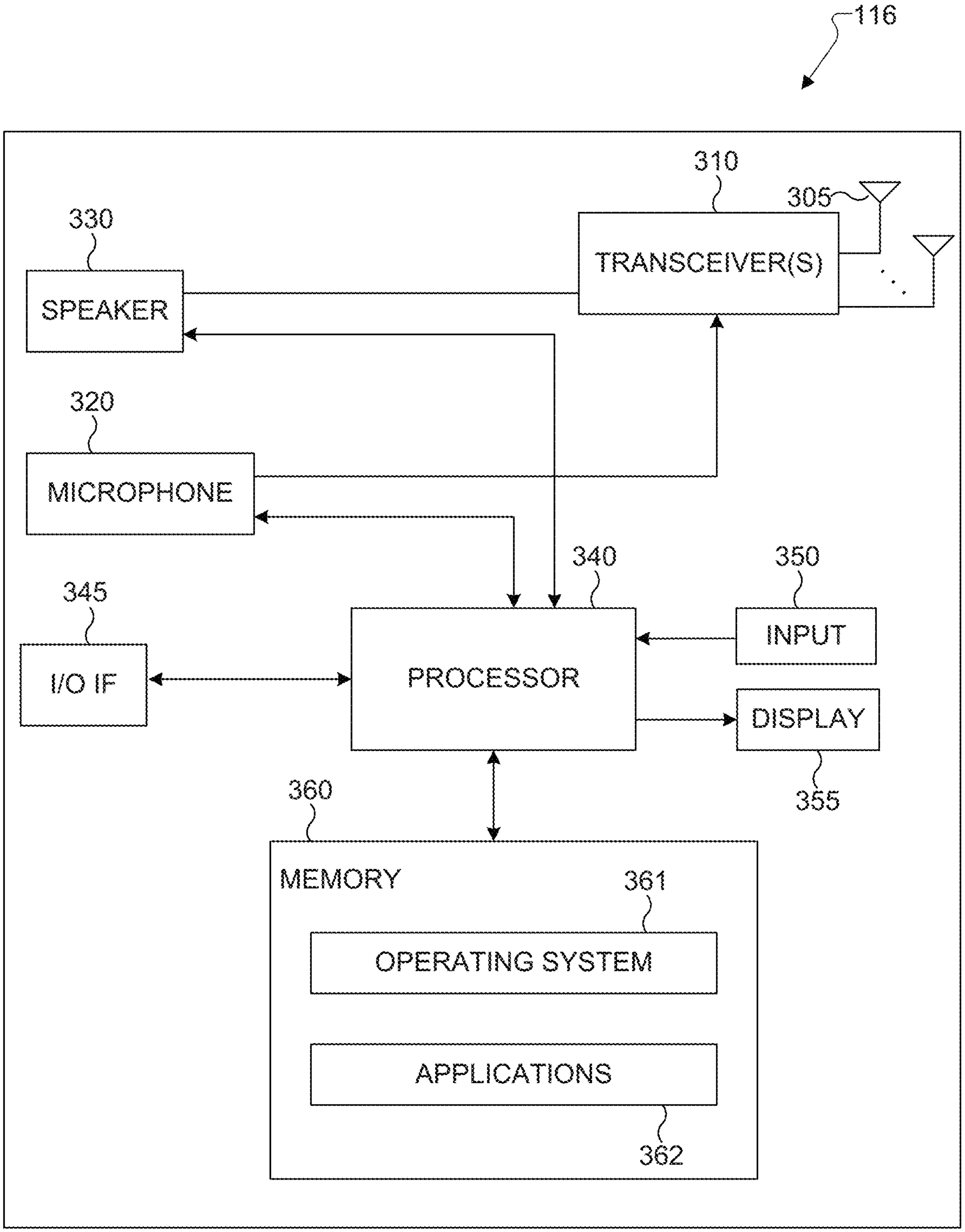
FIG. 3 illustrates an example UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for performing parameter optimization in cellular networks. In certain embodiments, one or more of the gNBs 101-103 includes circuitry, programming, or a combination thereof for performing parameter optimization in cellular networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to various embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support parameter optimization in cellular networks. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to various embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for parameter optimization in cellular networks. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

As discussed above, the operation and management of existing cellular networks pose significant challenges due to their size and complexity, resulting in high operating expenditure (OPEX) for cellular service providers. In cellular networks, a large volume of network data is generated by network devices such as base stations, core network elements and end user devices. This network data can include PM data (often time-series data such as counters, performance metrics, and measurements), FM data (such as alarm events that indicate a device has entered an erroneous state), and CM data (such as the configuration parameters and values of various network devices). The CM data may include records of all configuration changes that have been made historically, which is often referred to as a CM change log. To maintain good service quality for end users, operators should continuously monitor network performance benchmarks, such as KPIs and KQIs, across thousands of base stations and other devices in the network.

A typical 4G LTE cell can have hundreds or thousands of unique configuration parameters, with hundreds more added in the 5G New Radio (NR) cells, which are configured and updated through a CM system. Configuration changes may be made by engineers or automatic background processes such as Self Organizing Network (SON) functions in a legacy LTE system. Configuration changes are necessary in many cases, such as setting up a new cell deployment, remediating failures and faults, or optimizing the performance of a cell. For example, the antenna tilt may be adjusted to improve coverage or reduce interference to neighboring cells.

With thousands of base stations, each generating hundreds of KPIs, and alarms (amounting to hundreds of gigabytes of data each day), and with many configuration parameters, optimizing the network performance via a proper parameter configuration can require large investments in time and human labor. Moreover, engineers often rely on experience and trial-and-error for configuration management in cellular networks, which may require several iterations of adjusting one or more parameters and observing the impact to network performance over a time period. Therefore, manual optimization of parameters may be imprecise, possibly leading to sub-optimal performance. An intelligent CM analytics function is desired for an automated data-driven configuration management, which can speed up the inference and optimization processes, reduce the operational costs, and provide better quality of service for subscribers.

Figure 4A:
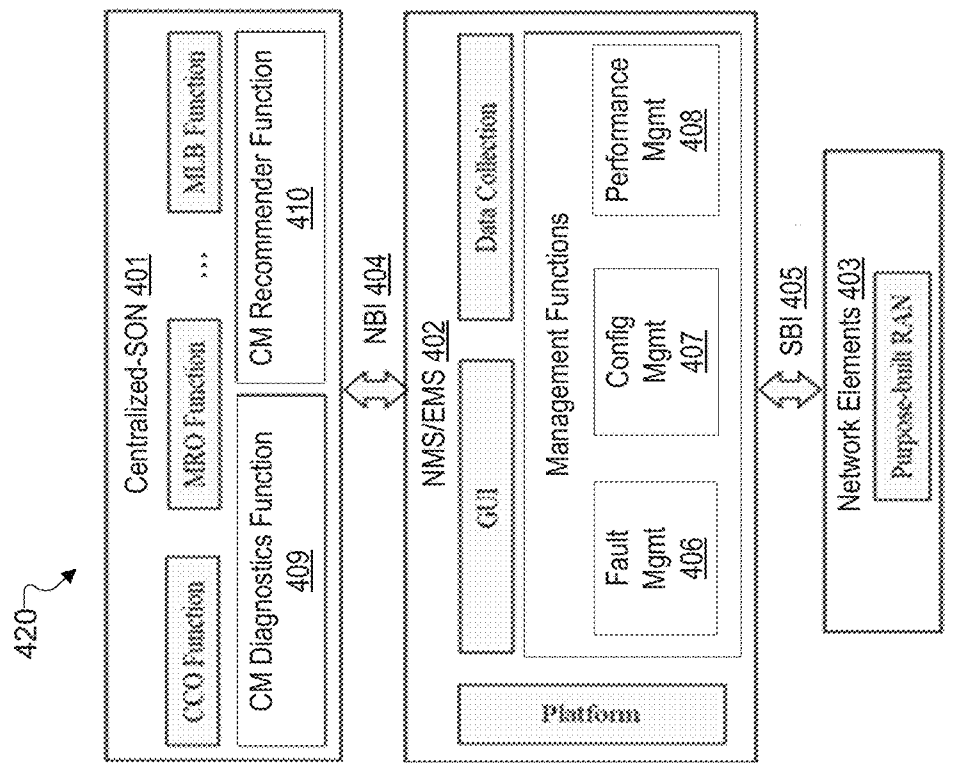
FIGS. 4A and 4B illustrate example CM analytics solutions according to various embodiments of the present disclosure.
Figure 4B:
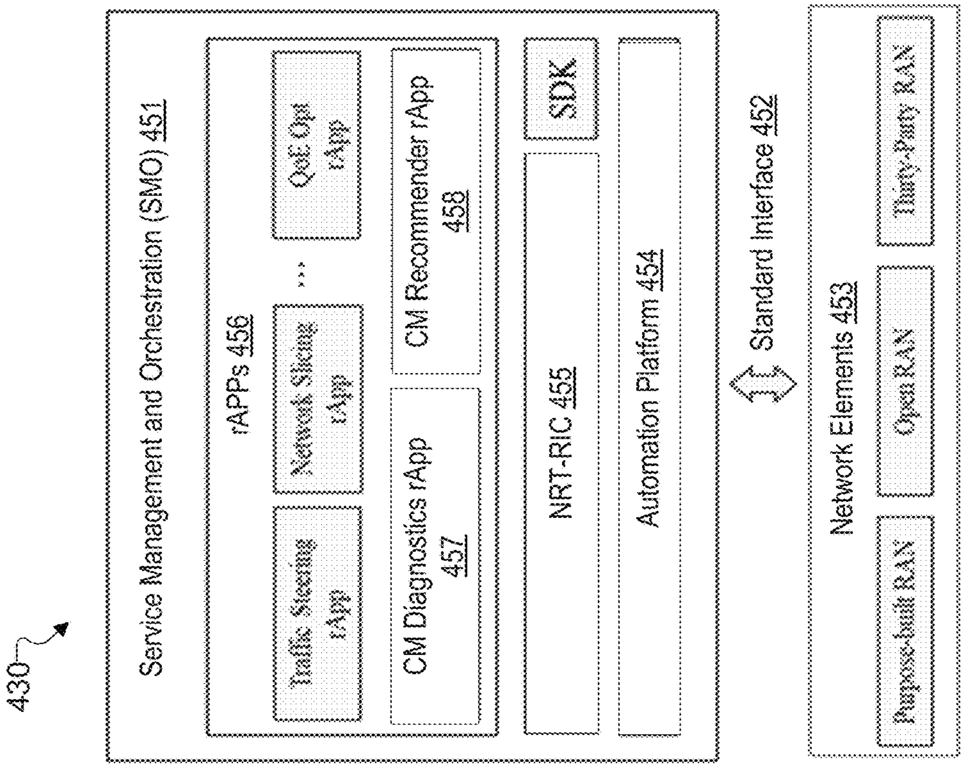

FIGS. 4A and 4B illustrate example CM analytics solutions according to various embodiments of the present disclosure. In particular, FIG. 4A shows a CM analytics solution in a conventional network operations, administration, and management (OA&M) system 420, and FIG. 4B shows a CM analytics solution in an advanced network OA&M system 430.

As shown in FIG. 4A, the conventional OA&M system 420 includes a centralized self-organizing network (C-SON) 401, a network management systems/element management system (NMS/EMS) 402, one or more network elements (NEs) 403, a northbound interface (NBI) 404, and a southbound interface (SBI) 405.

In the conventional OA&M system 420, the data source is the cellular network infrastructure, including the radio access network (RAN) shown in the NEs 403. RAN data may include measurements, metrics, and other data collected from a base station and UE devices. Data from the RAN may be collected and aggregated at a data collection unit located at the NMS/EMS 402 via the SBI 405 by employing certain specific protocols, such as simple network management protocols (SNMP). The NMS/EMS 402 performs several network functionalities including data collection functions, management functions, GUI, and the like.

Management functions in the NMS/EMS 402 include fault management (FM) 406, configuration management (CM) 407, performance management (PM) 408, and the like. The FM 406 traditionally includes fault detection, generation of alarms, clearing of alarms, alarm forwarding and filtering, storage and retrieval of alarms, correlation of alarms and events, alarm root cause analysis and fault recovery. FM data contains alarm information generated from networks. The CM 407 is provided to control and monitor the configuration settings for the NEs 403 and network resources (NRs), and offers an interface to add, modify, and delete configuration information for the NEs 403 and the NRs. CM data includes network configuration information such as parameter settings. The PM 408 is provided to monitor, troubleshoot, and/or optimize networks including the NEs 403 and the NRs. PM data includes a number of key performance indicator (KPI) counters for networks including the NEs 403 and the NRs, which are essentially statistical information and historical logs indicating a network (the NEs 403 and the NRs) performance.

The C-SON 401 includes a set of functions for automatic configuration, optimization, diagnostics and healing of cellular networks. Such functions not only include well-known SON functions such as coverage and capacity optimization (CCO), mobility robustness optimization (MRO), and mobile load balancing (MLB), but also other purpose-defined SON functions such as a CM diagnostics function 409 and a CM recommender function 410. The C-SON 401 provides a centralized architecture where the SON functions reside in the NMS/EMS 402 or a C-SON server that manages a group of NEs. The NBI 404 is an interface between the NMS/EMS 402 and the C-SON server. In the legacy network OA&M system, the SBI 405 is primarily proprietary and thus in general the NMS/EMS 402 can only communicate with their proprietary NEs such as base stations. While the NBI 404 is designed to support multi-vendor multi-domain technologies, in reality it is very difficult to fully integrate the NMS/EMS 402 with other vendor's SON products due to the lack of agreement on interface specifications.

To overcome the deficiency of the conventional OA&M system 420, advanced network OA&M system 430 includes a service management and orchestration platform (SMO) system 451, where both NBI and SBI are standardized. Via a standard interface 452 between the NEs 453 and an automation platform 454, RAN data is collected and aggregated at the automation platform 454. The SMO system 451 is not just a simple integration of SON functionalities into a legacy NMS/EMS. The SMO system 451 also includes additional modules such as a non-real-time RAN intelligent controller (NRT-RIC) 455, which manages and orchestrates software applications (e.g., rApps 456), which are NRT-RIC applications. Essentially, the SMO system 451 can be viewed as a next generation of NMS/EMS that leverages AI/ML technologies to enable closed-loop network automation. In particular, as a core module in SMO, the rApps 456 that are operated by the NRT-RIC 455 are designed to realize various network automation use cases. Due to the openness and programmability offered in the SMO system 451 (including a software development kit (SDK)), the development of the rApps 456 is not a privilege of network equipment vendors and service providers, but is open to other technology businesses such as startups. Intelligent CM analytics rApps 456, including a CM diagnostics rApp 457 and a CM recommender rApp 458, are designed to automatically identify CM misconfigurations and recommend an appropriate parameter setting for network KPI improvement. The outcome of CM diagnostics and CM recommender functions can be used for network engineers to take further actions such as correction of CM misconfiguration and/or recommendation of a better parameter setting.

In cellular network management systems (NMS), CM is a core component to manage parameter configurations. In a cellular network, a large number of parameters are needed to be configured appropriately in order to achieve desirable network KPI performance. Most existing CM tools do not support automatic selection of appropriate or optimal parameter configurations. Conventional techniques for determining parameter configurations in cellular networks involve relying on an engineer manual, such as a golden parameter list, or a trial-and-error approach carried out during field trials. In the former approach, default parameter configurations provided by an engineer manual are uniform across different cells. However, this method is suboptimal as many parameters are cell-specific and should be configured based on the cell's topology, environment, traffic patterns, and other factors. To improve KPI performance, the latter approach is often used in field trials, such as continuous performance improvement trials, to determine the appropriate parameter configurations. However, this trial-and-error approach requires manual tuning and heavy human intervention, resulting in high OPEX. Automating the process of determining appropriate parameter configurations plays a crucial role in reducing OPEX and improving network performance.

In cellular network optimization trials, changes are often made to certain parameters in some problematic cells to improve KPIs. The collected CM and PM data from these cells—including before, during, and after the optimization trial—can offer useful information into how different parameter settings impact KPI performance.

To address these and other issues, this disclosure provides methods and apparatuses for parameter optimization in cellular networks. The disclosed embodiments include multiple features, including data-driven, artificial intelligence (AI)-based CM solutions to determine parametric influences on KPIs/KQIs that do not require high OPEX, with the goal of determining optimal parametric settings. This can speed up inference and optimization procedures, reduce OPEX, and provide better service quality for end users. The disclosed embodiments can determine how to configure the same set of parameters for cells that have not undergone any parameter changes, by drawing inference from the CM/PM data collected from cells that have undergone parameter changes. Here, parameter recommendation can utilize historical data across multiple cells from a network to model the impacts of CM changes on network KPI without the need for cell clustering. Various metrics can be used to evaluate performance improvement associated with a CM change. In the following sections, these features are described in more detail.

Note that while some of the embodiments discussed below are described in the context of 4G and 5G systems, these are merely examples. It will be understood that the principles of this disclosure may be implemented in any number of other suitable contexts or systems, including 6G and other systems.

The embodiments discussed below utilize historical data across multiple cells (e.g., a cluster of cells) in a network to model the impacts of a CM change on network KPI. This enables the network to determine an improved or optimal parameter setting for a new cell, which has not yet undergone such changes. In particular, an improved or optimal parameter setting can be a new setting for the cell.

Figure 5:
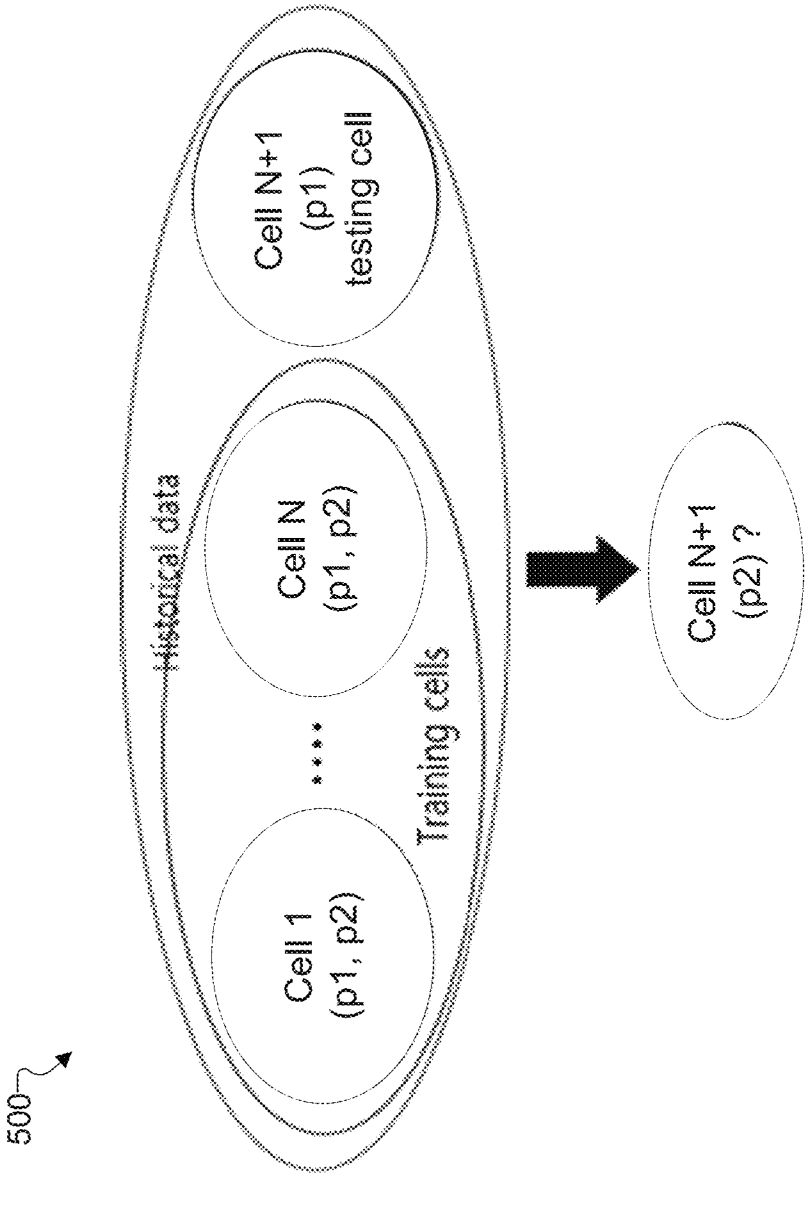
FIG. 5 illustrates an example network in which a CM change has occurred according to various embodiments of the present disclosure.

FIG. 5 illustrates an example network 500 in which a CM change has occurred according to various embodiments of the present disclosure. As shown in FIG. 5, a CM change from a parameter configuration collectively referred to as p1 was changed to configuration p2 at various points of time for Cell 1, Cell 2, . . . , Cell N. The question raised in FIG. 5 is whether this information can be used to predict the impact of parameter configuration p2 at a new cell, Cell N+1. FIG. 5 illustrates a case where a given CM change was observed historically. The disclosed embodiments are not restricted to this requirement. Further, the disclosed embodiments may be used to not only predict the effect of a given CM change, but all rank nominal changes to suggest an optimal CM configuration.

Figure 6:
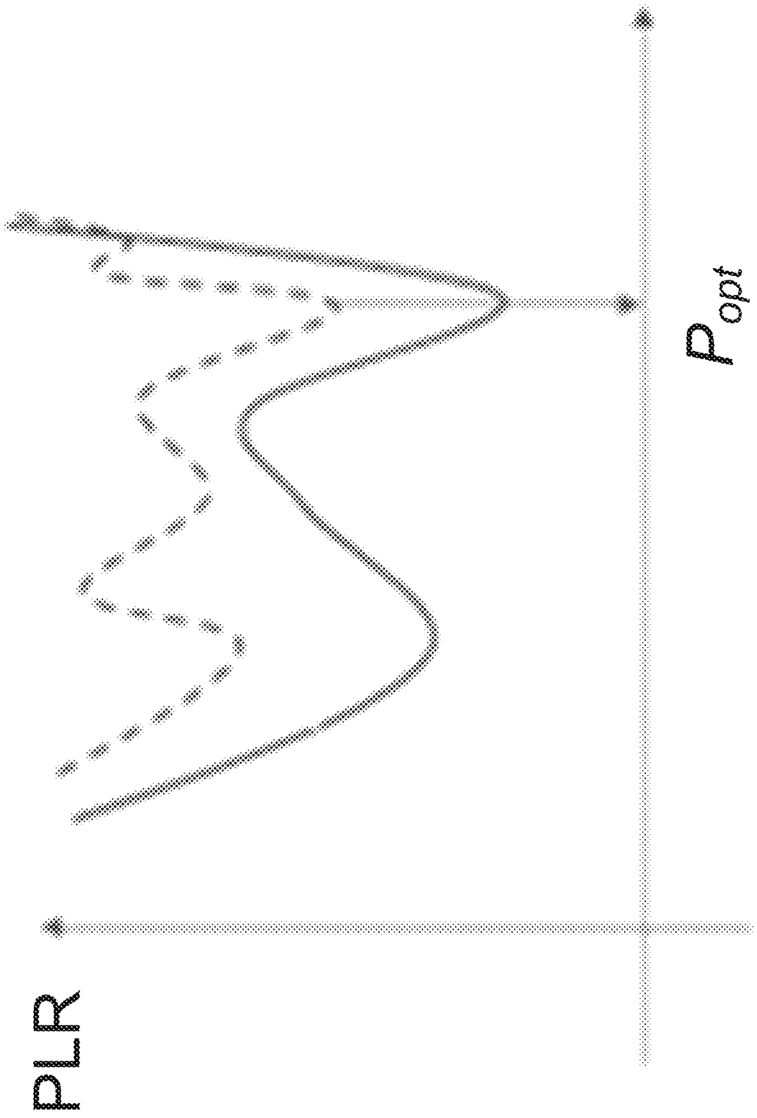
FIG. 6 illustrates a graph that compares a predicted packet loss rate and a true packet loss rate across various parameter settings.

The disclosed embodiments can determine the quality of a prediction. In determining the quality of a prediction, the numerical error between the prediction and the ground truth is less important than whether the predictions across various CM changes preserve the ordinal relation of the actual effects of the change. This is illustrated in FIG. 6. In FIG. 6, the dashed line represents a prediction of some quantity such as packet loss rate (PLR) across various parameter settings, and the solid line represents the true PLR under that setting. Although the prediction is inaccurate without a constant bias, it still mostly preserves the ordinal relationship of the various settings in terms of their PLR. The predictor can be considered as a kind of easily calculated surrogate function, and optimizing the surrogate provides an efficient means to approximately minimize the actual function.

Figure 7:
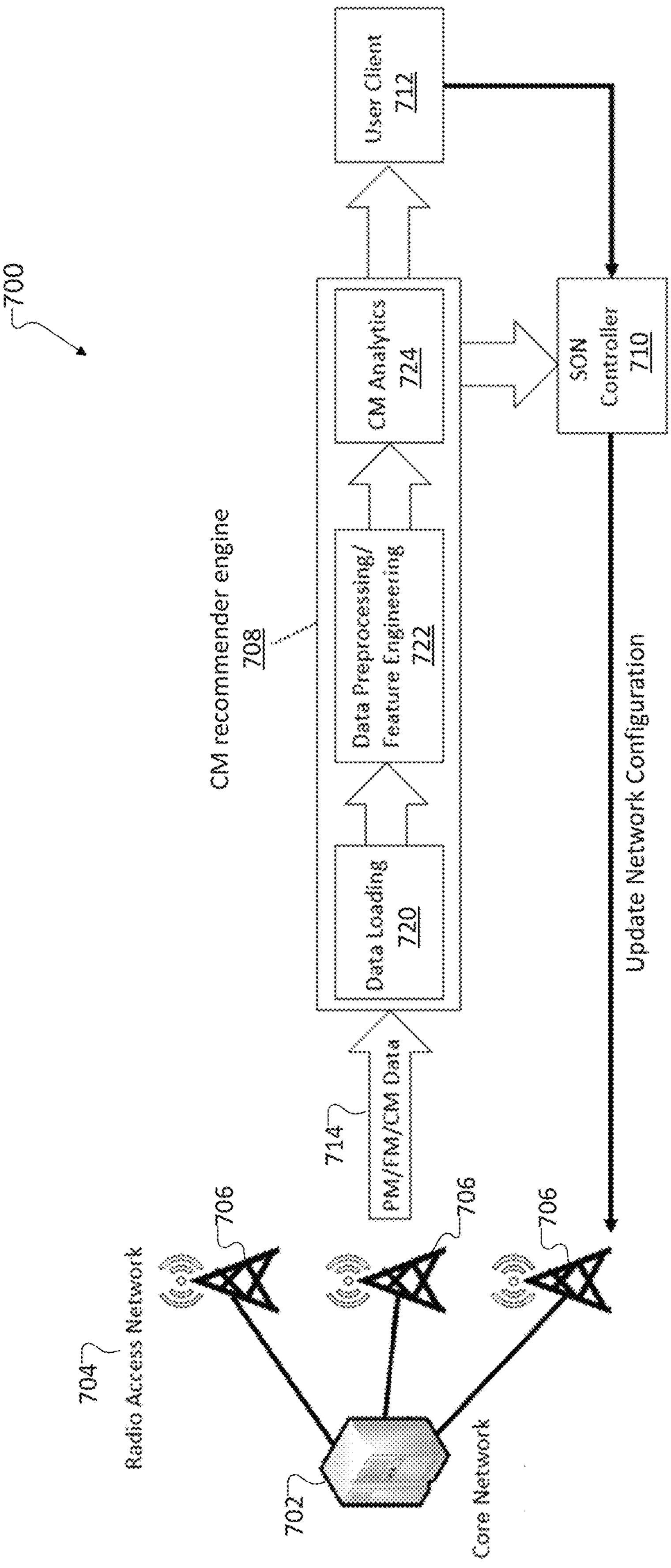
FIG. 7 illustrates an example system for parameter optimization in cellular networks according to various embodiments of the present disclosure.

FIG. 7 illustrates an example system 700 for parameter optimization in cellular networks according to various embodiments of the present disclosure. The embodiment of the system 700 shown in FIG. 7 is for illustration only. Other embodiments of the system 700 could be used without departing from the scope of this disclosure. For ease of explanation, the system 700 will be described as being implemented in the wireless network 100 of FIG. 1. However, the system 700 could be implemented in any other suitable network or system.

As shown in FIG. 7, the system 700 includes a cellular network infrastructure, including a core network (CN) 702 and a radio access network (RAN) 704, which serves as a data source for the system 700. The RAN 704 includes multiple network elements 706. Each network element 706 is a discrete telecommunications entity such as an eNodeB in LTE or a gNodeB in NR cellular networks. In particular, each network element 706 can represent (or be represented by) one or more of the gNBs 101-103 of FIG. 1. The system 700 also includes a CM recommender engine 708, one or more SON controllers 710, and a user client 712. The user client 712 can represent (or be represented by) one or more of the UEs 111-116 of FIG. 1.

A network management module of the RAN 704 (such as a NMS/EMS) collects RAN data 714 from the network elements (NEs) 706 via certain specific protocols, which can be proprietary or standard protocols such as SNMP. The RAN data 714 can include PM data, FM data, CM data, or a combination of these. The RAN data 714 is provided as input to the CM recommender engine 708. The CM recommender engine 708 performs multiple operations in the system 700, including a data loading operation 720, a data preprocessing/feature engineering operation 722, and a CM analytics operation 724.

The data loading operation 720 obtains the RAN data 714 from the RAN 704 and makes the RAN data 714 available to the CM recommender engine 708, such as by storing the RAN data 714 in a database or a memory. For example, batches of network data may be retrieved from the database, or data may be streamed directly from the RAN 704 to the CM recommender engine 708. The CM recommender engine 708 supports both offline processing of batch data and real-time processing of streaming data.

The data preprocessing/feature engineering operation 722 includes operations to prepare the loaded data for use during the CM analytics operation 724. The data preprocessing/feature engineering operation 722 may include (but is not limited to) any one or more of the following: (i) removing invalid data samples, (ii) normalizing or scaling the data, (iii) removing trends and seasonality in time-series data, (iv) generating additional synthetic features from the existing KPIs and other fields in the data, (v) selecting a subset of the data samples or fields, such as a specific timeframe or a group of network devices, (vi) merging the PM/FM and CM data into a combined data set, for example, by matching the eNB/gNB ID and cell number fields and the timestamp of entries in the PM/FM data and the CM data, and (vii) feature selection for model construction based on engineering domain knowledge and AI techniques.

As an example, the data preprocessing/feature engineering operation 722 may include (but is not limited to) any one or more of the following steps.

(1) Data cleaning and filtering: In this step, the non-busy hour, weekend, and US holiday data are filtered out, and the data corresponding to outliers and missing values are removed. For example, in some embodiments, the busy hours can be defined as 8:00 am to 9:00 pm; weekends consist of Saturday and Sunday; US holidays can be selected by using a Python built-in function from a holidays package (e.g., holidays.US( )). Outliers can be identified by statistical outlier detection techniques or based on predetermined thresholds on KPIs. The missing values may include "NA" and "NaN" values. Of course, other data can be filtered out according to other rules, which are within the scope of this disclosure.

(2) Synthetic feature generation: In this step, certain sets of synthetic features are generated from the existing KPIs. For example, the cumulative distribution of each KPI can be generated and used as a synthetic feature.

(3) Feature Selection for model training efficiency improvement:

In the feature selection step, a causality graph can be built using domain knowledge to filter out some features (regressors) that are highly impacted by parameter settings.

Figure 8:
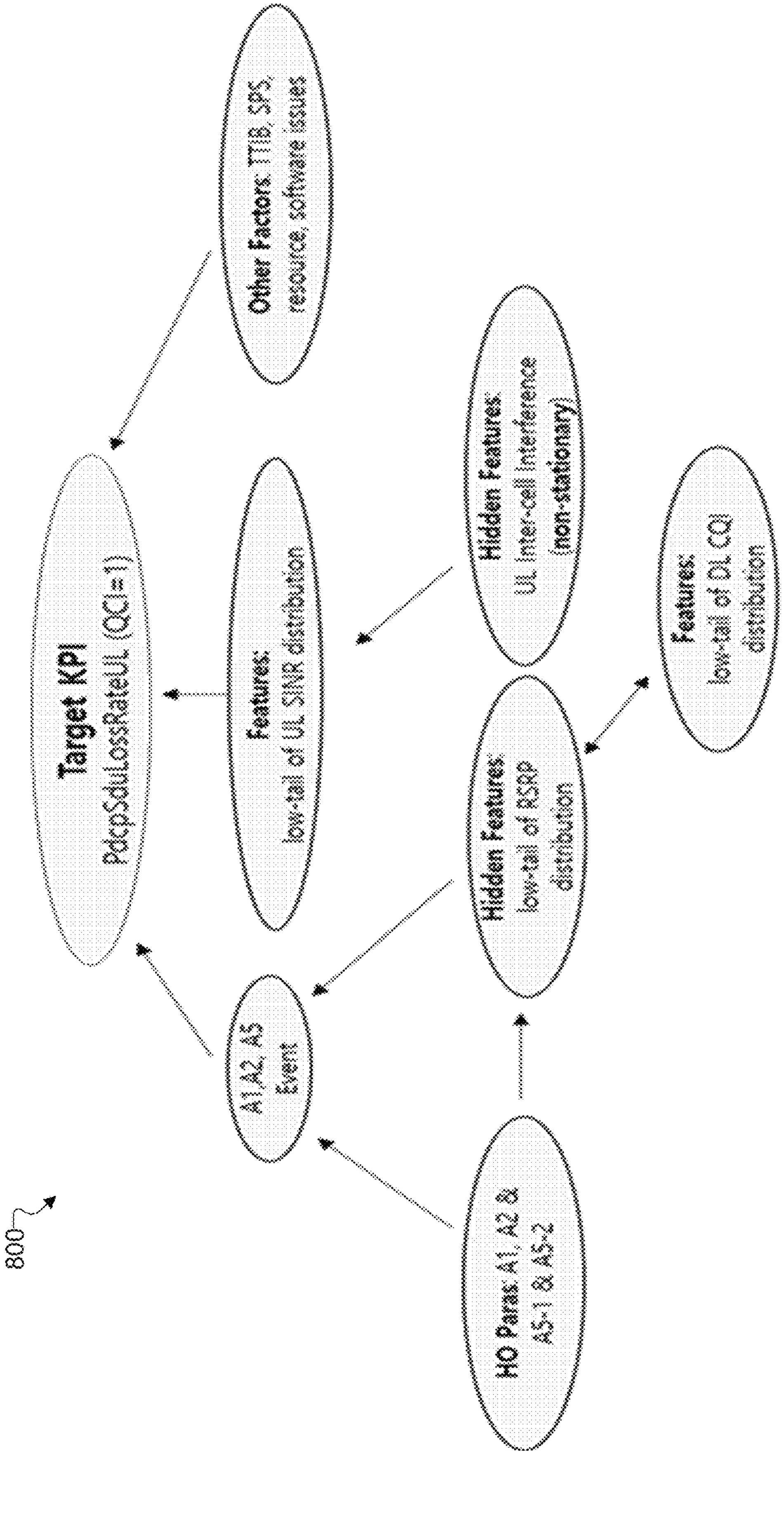
FIG. 8 illustrates an example causality graph built using domain knowledge according to various embodiments of the present disclosure.

The feature selection step can include an initial candidate feature selection. Based on engineering domain knowledge, KPIs are selected from PM data as features (regressors) of the machine learning models (particularly, the regression models) to be trained. FIG. 8 illustrates an example causality graph 800 built using domain knowledge according to various embodiments of the present disclosure. By constructing a causality graph using domain knowledge, the parameters and regressors that have the greatest impact on target KPI can be identified.

Once these important regressors have been identified, the other KPIs can be eliminated from the PM data. However, even with this initial selection, there may still be a large number of regressors to work with. While domain-knowledge-based feature selection methods are generally reliable because they are based on engineering physics, they can still be imprecise if it is difficult to quantify the impact of certain features.

The feature selection step can also include feature selection for model training efficiency improvement. The primary purpose of performing feature selection is to improve efficiency of model training and prediction without having much model performance degradation. To achieve this goal, a certain number of features can be selected that have relatively large impacts on the target KPI. The following five steps describe this feature selection procedure.

Step 1: A causality graph built using engineering domain knowledge is used to filter out some features (regressors) highly impacted by parameter settings. To be specific, features (regressors) satisfying the following two conditions are selected: 1) selected features have no strong causality relationship with tuning parameters, and 2) selected features (called B) should not have the following causation relationship with the target KPI (called A): A (target KPI) should not cause B (selected features), and A (selected features) and B (target KPI) should not be caused by a common C.

Step 2: The pairwise correlations (e.g., the Pearson correlation in Eqn. 1 below or Kendall rank correlation) are calculated with proxy variables (KPI features) for each remaining features (regressors) from Step 1, which refers to the variables that are highly impacted by parameter settings. The remaining features from Step 1 are ranked based on the absolute values of the calculated pairwise correlation coefficients (e.g., the absolute values of the Pearson correlation coefficients) from largest to smallest, and then the features (regressors) are filtered out that rank top N features with N denoting a design parameter.

Step 3: The Pearson correlation coefficients between the remaining selected features from Step 2 and the target KPI using data samples at a cell level are calculated as follows:

$$r_{xy,c} = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}} \quad (1)$$

where $r_{xy,c}$ denotes the Pearson coefficient at a cell with c denoting 'cell'. Next, the selected features from Step 2 are ranked based on the Pearson coefficients from highest to lowest values, i.e., the first element in the ranked feature list has the largest Pearson coefficient. The ranked feature list is referred to as List1 and List1[i] denotes the i-th element in the list. Some of these features may be highly linearly correlated, i.e., strong multicollinearity may occur among these features.

Step 4: A set of features are obtained that have much reduced multicollinearity and similar prediction power for the target KPI as compared with the selected features from Step 3. To this end, start with the ranked feature list from Step 3 and select features iteratively. The output of the selected feature list from this stem is termed as List2.

Step 5: Random Forest (RF)-based permutation importance is applied to rank feature importance from largest to smallest. Select top K features of List2 based on the values of feature importance scores, where the value of K is selected based on the availability of computational power and time available for training the models.

Due to the high complexity of today's cellular networks, it is difficult to anticipate how a configuration change may impact performance or what is the optimal parameter setting for a given cell. Thus, the CM recommender engine 708 can perform the CM analytics operation 724 in order to leverage historical data from across the entire network to anticipate the impact of a change.

Figure 9:
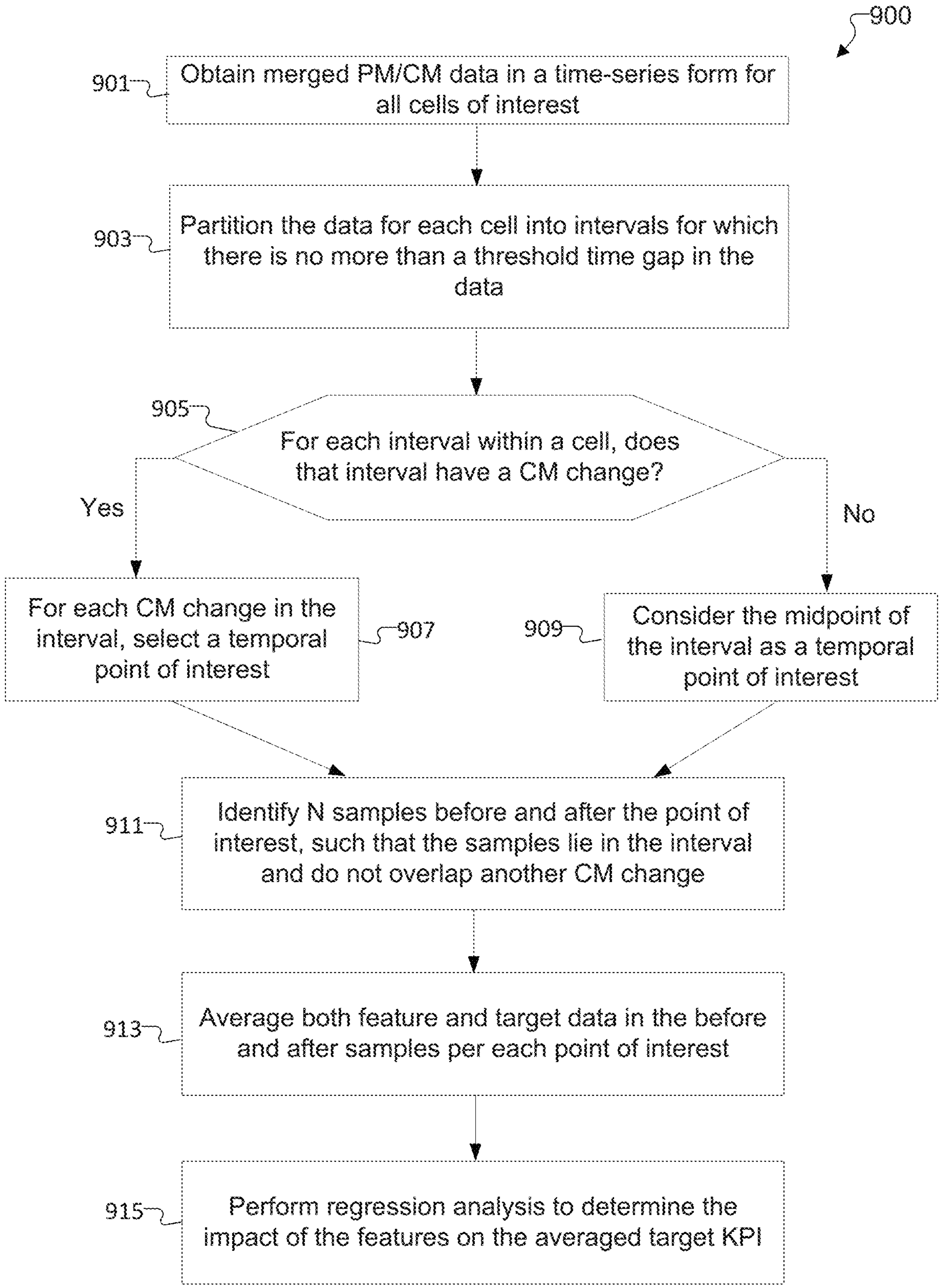
FIG. 9 illustrates an example process included in a CM analytics operation in the system of FIG. 7 according to various embodiments of the present disclosure.

FIG. 9 illustrates an example process 900 that can be performed as part of the CM analytics operation 724 according to various embodiments of the present disclosure. As shown in FIG. 9, the process 900 can start with operation 901, in which the CM recommender engine 708 obtains the PM and CM time-series data collected from all cells of interest. At operation 903, the PM and CM time-series data for each cell is partitioned into multiple distinct time intervals based on time gaps in the data. That is, the set of PM and CM data is partitioned into the multiple time intervals such that each time interval does not include any time gaps of no data that are longer than a predetermined threshold period. Such gaps may be due to a cell being temporarily shut off, or, more likely, a failure to download data from a base station. The CM recommender engine 708 identifies these intervals so as to avoid the calculation of any statistics over a large temporal gap in the data.

Next, at operation 905, it is determined, for each time interval in a cell, whether there has been one or more CM configuration changes during that interval. If there has been one or more CM configuration changes during the time interval, then at operation 907, the CM recommender engine 708 selects a temporal point of interest that coincides with each CM configuration change in the time interval. In some embodiments, the time of the CM configuration change is selected as the temporal point of interest. Alternatively, if the time interval does not include any CM configuration change, then at operation 909, the CM recommender engine 708 selects the midpoint of the time interval as the temporal point of interest. Data from the time intervals that do not include a CM change are useful for capturing natural variations in the KPIs not associated with a CM change.

Figure 10:
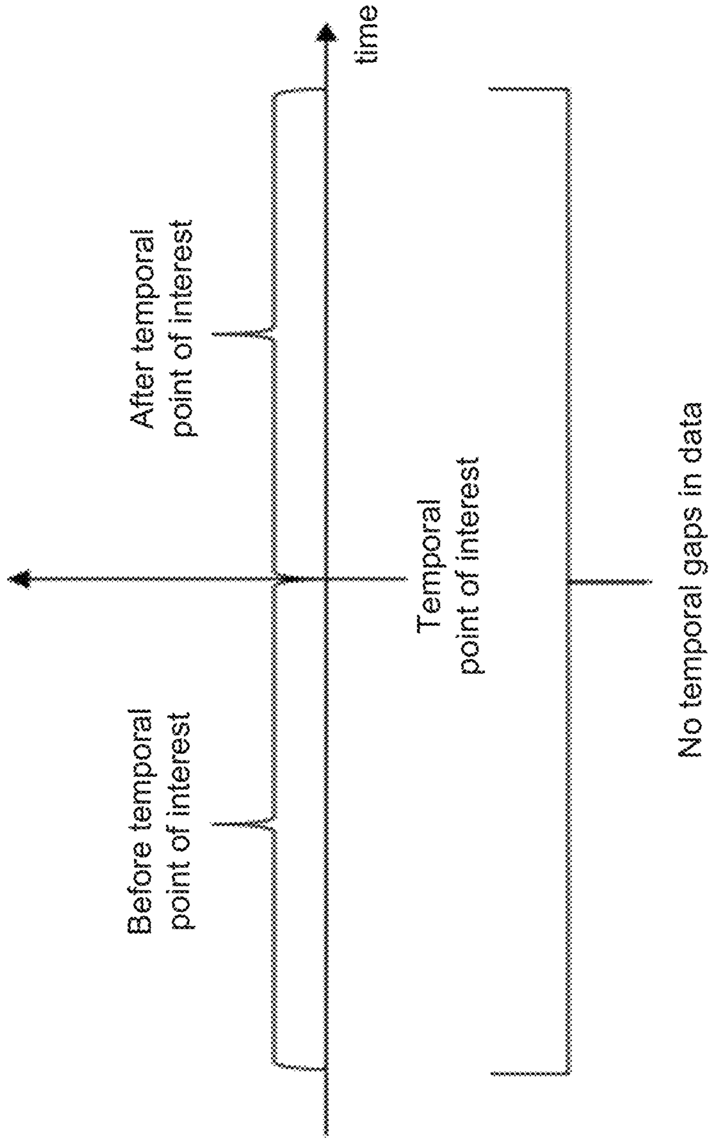
FIG. 10 illustrates examples of before and after intervals according to various embodiments of the present disclosure.

At operation 911, for each determined temporal point of interest in each time interval (as determined in operation 907 or operation 909), the 'before' and 'after' intervals are identified such that no other configuration changes happen within these intervals, and both 'before' and 'after' intervals are entirely contained in the larger interval that has no significant temporal gaps. FIG. 10 illustrates examples of the 'before' and 'after' intervals according to various embodiments of the present disclosure. Within the 'before' and 'after' intervals, a set of multiple data samples are identified such that the samples in each set lie within the interval and do not overlap another CM change. At operation 913, both the features and the target KPI in the sets of 'before' samples and 'after' data samples are averaged. Finally, at operation 915, regression analysis is performed to predict the change in the average target KPI due to 1) changes in CM parameters, 2) values of the CM parameters in the 'before' interval, and 3) averaged values of the KPIs in the 'before' interval. The regression analysis can be expressed mathematically as:

$$\Delta\text{Target}_t = f(P_t, \Delta P_t, \text{Target}_t, X_t)$$

where $\text{Target}_t$ is the value of a target KPI (e.g., uplink total packets lost, uplink packet loss rate) at time t, $$\Delta\text{Target}_t = \text{Target}_{t+1} - \text{Target}_t,$$

$P_t$ are the CM parameter settings at time t, $$\Delta P_t = P_{t+1} - P_t,$$

and $X_t$ is a vector of other KPI values at time t.

Any suitable regression techniques can be used here, including linear regression, support vector machine regression, neural networks, random forests, or Bayesian versions of these techniques.

In some embodiments, random forests can be used to predict changes in average packet loss rate (PLR). Specifically, the embodiments described above can be used to analyze the effects of a CM change on the average PLR and total packets lost (PdcpSduLossULNum). To establish notation for packet loss rate (PLR), the following quantities can be defined:

$$PLR_b = \frac{\sum_{i \in before} PdcpSduLossULNum_i}{\sum_{i \in before} PdcpSduTotalULNum_i}$$

$$PLR_a = \frac{\sum_{i \in after} PdcpSduLossULNum_i}{\sum_{i \in after} PdcpSduTotalULNum_i}$$

$$\Delta PLR = PLR_a - PLR_b$$

$$PLR_{inc} = \begin{cases} 1 & \text{if } \Delta PLR \geq 0 \\ 0 & \text{otherwise} \end{cases},$$

Note that the ratio of the total packets lost to the total attempted is considered over the entire 'before' or 'after' interval, instead of averaging the ratios sampled periodically (e.g., every 15 minutes), as this is likely more relevant to the goal of the operator.

Because random forests are models that can be susceptible to imbalances in the training data, methodologies to alleviate this source of bias are also considered. For example, the training data can be grouped according to the 'before' and 'after' CM parameter settings, and within each group consider the sets:

$$\Delta PLR_{inc} = \{s \mid PLR_a \geq PLR_b\}$$

$$\Delta PLR_{dec} = \{s \mid PLR_a < PLR_b\}$$

That is, the data samples in the group can be divided according to whether there is an increase or decrease in the packet loss rate. A new collection of data samples can then be constructed by randomly oversampling with replacement from the underrepresented set so that the new collection has an equal number of samples with positive and negative ΔPLR. This technique can be referred to as "balanced sampling." To evaluate the performance of the prediction, one or more conventional metrics such as $R^2$ and WAPE (weighted average percentage error) can be considered.

As mentioned earlier, more important than absolute accuracy is preservation of ordinality. Specifically, if parameter setting p1 causes a larger reduction in PLR than parameter setting p2 (i.e., $\Delta PLR p1 < \Delta PLR p2$), then the same should hold for the prediction (i.e., $\Delta\widehat{PLR} p1 < \Delta\widehat{PLR} p2$). Relatedly, the ability to accurately predict the correct direction of a change in PLR after a CM change can be considered, such as by the following:

$$\text{Correct direction } \Delta PLR = \frac{\sum_i (\text{sign}(\Delta PLR_{true,i} \times \Delta PLR_{pred,i}) + 1)/2}{N}$$

where N is the number of samples in the test.

Besides absolute accuracy, it is also helpful to consider further refinements to improve the ability to predict decreases (or increases) in PLR given an actual decrease (or increase), and conversely whether a decrease (or increase) occurred given the prediction. For this, the following statistics can be used to evaluate performance:

$$Prob[\Delta PLR_{pred} > 0 \mid \Delta PLR_{true} > 0] = \frac{\sum_i (\Delta PLR^i_{pred} > 0) * (\Delta PLR^i_{true} > 0)}{\sum_i \Delta PLR^i_{true} > 0}$$

$$Prob[\Delta PLR_{true} > 0 \mid \Delta PLR_{pred} > 0] = \frac{\sum_i (\Delta PLR^i_{pred} > 0) * (\Delta PLR^i_{true} > 0)}{\sum_i \Delta PLR^i_{pred} > 0}$$

$$Prob[\Delta PLR_{pred} < 0 \mid \Delta PLR_{true} < 0] = \frac{\sum_i (\Delta PLR^i_{pred} < 0) * (\Delta PLR^i_{true} < 0)}{\sum_i \Delta PLR^i_{true} < 0}$$

$$Prob[\Delta PLR_{true} < 0 \mid \Delta PLR_{pred} < 0] = \frac{\sum_i (\Delta PLR^i_{pred} < 0) * (\Delta PLR^i_{true} < 0)}{\sum_i \Delta PLR^i_{pred} < 0}$$

$$F1 = \frac{4}{\frac{1}{Prob[\Delta PLR_{pred} > 0 \mid \Delta PLR_{true} > 0]} + \frac{1}{Prob[\Delta PLR_{true} > 0 \mid \Delta PLR_{pred} > 0]} + \frac{1}{Prob[\Delta PLR_{pred} < 0 \mid \Delta PLR_{true} < 0]} + \frac{1}{Prob[\Delta PLR_{true} < 0 \mid \Delta PLR_{pred} < 0]}}$$

In words, the first four statistics are the probabilities that the system predicts an increase in PLR when there actually is an increase, that there is a decrease when one is predicted, that the system predicts a decrease when there actually is a decrease, and that there is a decrease when the system predicts one. The last statistic (F1) is the harmonic mean of the previous four quantities, and can be used as a performance score indicating an improvement or a degradation in the PLR. The harmonic mean can be chosen to avoid any of the first four statistics being much smaller than the others. It is noted that a conventional F1 score in statistical analysis is typically taken as the harmonic mean of precision and recall. As all four of the above quantities are relevant to this application, this modified F1 score statistic can be used to better serve the analysis.

In some embodiments, the techniques discussed above may be extended or enhanced. The items discussed below are merely representative of the kinds of enhancements that are possible.

Extending the target KPI beyond ΔPLR or ΔPdcpSduLossULNum. For example, the regression function may be trained and tested directly on values after the CM change and then the predicted change in the target KPI calculated a posteriori. Another option would be to predict the averaged packet loss rate, PdcpSduLossRateUL. This differs from the prior discussion in that it is considering an average of ratios instead of a ratio of averages.

Evaluation test cases where the true change in PLR is negligibly small can be removed. This enables focusing on the ability to predict larger changes correctly.

A drift adjustment to the prediction can be performed. For example, suppose it is desired to use the model to predict the change in a target KPI associated with a CM parameter combination change p1→p2. It is possible that a bias in the training set could result in a non-zero prediction associated with a null change p1→p1. To compensate, the initial prediction ΔTargetp1→p2 can be adjusted by the model bias ΔTargetp1→p1, thus making the final prediction ΔTarget-adjusted=ΔTargetp1→p2−ΔTargetp1→p1.

In the context of using random forest for regression, most software averages the target values over the trees comprising the ensemble. In some embodiments, the median of the ensemble values can also be examined for a more robust estimation.

The embodiments disclosed herein provide techniques to estimate the impact of tuning CM parameters without relying on physical simulations and ray tracing techniques, which require expensive topographic data on building foliage, building materials, window placements, and the like. The disclosed techniques are purely data driven based on the historical performance of cells in the network that are to be optimized.

For example, the disclosed embodiments can be used for open-loop parameter optimization. Here, open-loop parameter optimization involves using historical data (offline data) to recommend parameter settings for improving KPIs. The disclosed techniques can be utilized to estimate the impact of a given CM change on the average packet loss rate, using historical data from multiple network cells. Using these techniques, proposed nominal CM changes can be evaluated to determine which change is most likely to result in the greatest reduction of packet loss rate for a new cell, which has not yet undergone CM changes.

The disclosed embodiments can also be used for closed-loop parameter optimization. Here, closed-loop parameter optimization can be used to improve network KPIs by adjusting parameters through online tuning, which provides timely feedback on KPIs under different settings. In some scenarios, this approach could potentially result in KPI degradation. To mitigate this risk, a parameter recommender solution that solely relies on historical data (offline data) can be employed to offer a reliable starting point for online parameter tuning. Therefore, the proposed solution can potentially reduce the risk of KPI degradation during the online parameter tuning process.

The disclosed embodiments can also be used for sensitivity analysis. For a given target KPI, the disclosed techniques can be used to access the sensitivity of that KPI with different parameters. Having identified the potentially most impactful parameters at a given cell, attention may be focused on these during field trials.

All of these use cases can be performed automatically before human involvement to improve network performance, thus reducing the amount of manpower and time currently required in field trial optimization.

Although FIGS. 7 through 10 illustrate an example of a system for parameter optimization in cellular networks and related details, various changes may be made to FIGS. 7 through 10. For example, various components in FIGS. 7 through 10 could be combined, further subdivided, or omitted and additional components could be added according to particular needs. In addition, while shown as a series of steps, various operations in FIGS. 7 through 10 could overlap, occur in parallel, occur in a different order, or occur any number of times. In another example, steps may be omitted or replaced by other steps.

Figure 11:
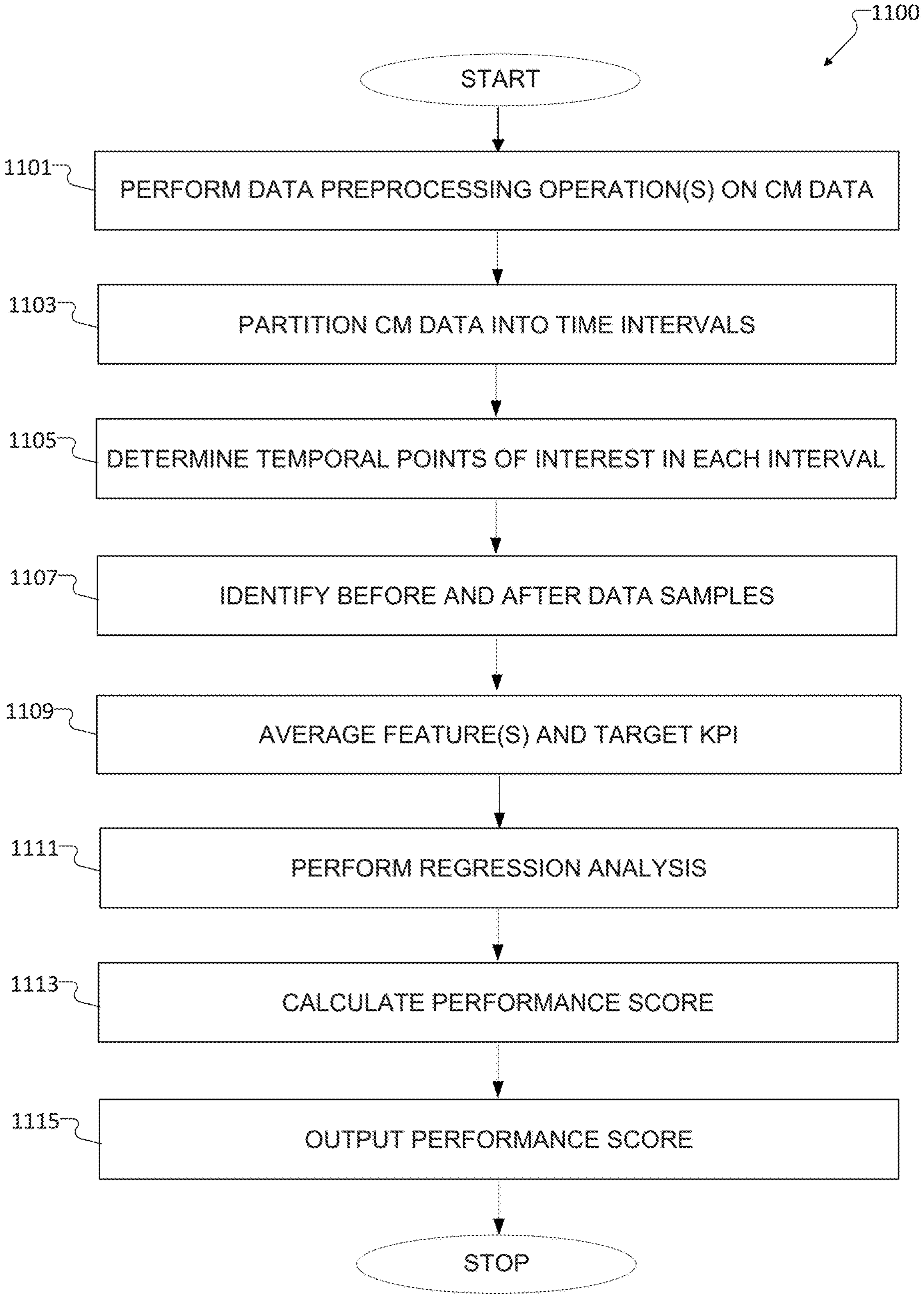
FIG. 11 illustrates a flow chart of a method for parameter optimization in cellular networks according to various embodiments of the present disclosure.

FIG. 11 illustrates a flow chart of a method 1100 for parameter optimization in cellular networks according to various embodiments of the present disclosure, as may be performed by one or more components of the wireless network 100 (e.g., the gNB 102). The embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1101. At step 1101, at least one of multiple data preprocessing operations is performed on a set of CM data for one or more cellular network devices. The multiple data preprocessing operations can include (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices. This could include, for example, the gNB 102 using the CM recommender engine 708 to performing the data preprocessing/feature engineering operation 722.

At step 1103, the set of CM data is partitioned into multiple distinct time intervals. This could include, for example, the gNB 102 using the CM recommender engine 708 to perform operation 903 in FIG. 9. At step 1105, one or more temporal points of interest in each time interval are determined based on whether CM changes exist during that time interval. This could include, for example, the gNB 102 using the CM recommender engine 708 to perform operations 905, 907, and 909.

At step 1107, for each temporal point of interest in each time interval, a first set of data samples are identified before that temporal point of interest and a second set of data samples are identified after that temporal point of interest. This could include, for example, the gNB 102 using the CM recommender engine 708 to perform operation 911. At step 1109, for each temporal point of interest in each time interval, one or more features and a target KPI are averaged in the first set of data samples and in the second set of data samples. This could include, for example, the gNB 102 using the CM recommender engine 708 to perform operation 913.

At step 1111, regression analysis is performed to determine an impact of the features on the target KPI. This could include, for example, the gNB 102 using the CM recommender engine 708 to perform operation 915. At step 1113, a performance score indicating an improvement or a degradation in the target KPI is calculated. This could include, for example, the gNB 102 using the CM recommender engine 708 to calculate an F1 score or a modified F1 score as described earlier. At step 1115, the performance score is output. This could include, for example, the gNB 102 outputting the F1 score or another performance score to a user client 712 or a SON controller 710.

Although FIG. 11 illustrates one example of a method 1100 for parameter optimization in cellular networks, various changes may be made to FIG. 11. For example, while shown as a series of steps, various steps in FIG. 11 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

partitioning, based on a time gap, a set of configuration management (CM) data for one or more cellular network devices into multiple distinct time intervals, wherein the time gap is included in the set of CM data and identified based on a status of a cell to which the one or more cellular network devices belong;

determining one or more temporal points of interest in each time interval based on whether CM changes exist during that time interval;

for each temporal point of interest in each time interval:

identifying a first set of data samples before that temporal point of interest and a second set of data samples after that temporal point of interest; and averaging features and a target key performance indicator (KPI) in the first set of data samples and in the second set of data samples; and performing regression analysis to determine an impact of the features on the target KPI.

2. The method of claim 1, further comprising:

calculating a performance score indicating an improvement or a degradation in the target KPI; and outputting the performance score.

3. The method of claim 1, wherein the set of CM data is partitioned into the multiple distinct time intervals such that each time interval does not include time gaps of no data that are longer than a predetermined threshold period.

4. The method of claim 1, wherein determining the one or more temporal points of interest in each time interval based on whether or not CM changes exist during that time interval comprises:

for a time interval that has no CM change, selecting a midpoint of that time interval as a temporal point of interest; and for a time interval that has at least one CM change, selecting a time coinciding with each of the at least one CM change as a temporal point of interest.

5. The method of claim 1, further comprising:

performing at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

6. The method of claim 1, wherein the target KPI comprises a packet loss rate.

7. The method of claim 1, wherein the features comprise at least one of:

one or more KPIs other than the target KPI; and one or more synthetic features generated from existing KPIs.

8. A device comprising:

a transceiver; and a processor operably connected to the transceiver, the processor configured to:

partition, based on a time gap, a set of configuration management (CM) data for one or more cellular network devices into multiple distinct time intervals, wherein the time gap is included in the set of CM data and identified based on a status of a cell to which the one or more cellular network devices belong;

determine one or more temporal points of interest in each time interval based on whether CM changes exist during that time interval;

for each temporal point of interest in each time interval:

identify a first set of data samples before that temporal point of interest and a second set of data samples after that temporal point of interest; and average features and a target key performance indicator (KPI) in the first set of data samples and in the second set of data samples; and perform regression analysis to determine an impact of the features on the target KPI.

9. The device of claim 8, wherein the processor is further configured to:

calculate a performance score indicating an improvement or a degradation in the target KPI; and output the performance score.

10. The device of claim 8, wherein the set of CM data is partitioned into the multiple distinct time intervals such that each time interval does not include time gaps of no data that are longer than a predetermined threshold period.

11. The device of claim 8, wherein to determine the one or more temporal points of interest in each time interval based on whether or not CM changes exist during that time interval, the processor is configured to:

for a time interval that has no CM change, select a midpoint of that time interval as a temporal point of interest; and for a time interval that has at least one CM change, select a time coinciding with each of the at least one CM change as a temporal point of interest.

12. The device of claim 8, wherein the processor is further configured to:

perform at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

13. The device of claim 8, wherein the target KPI comprises a packet loss rate.

14. The device of claim 8, wherein the features comprise at least one of:

one or more KPIs other than the target KPI; and one or more synthetic features generated from existing KPIs.

15. A non-transitory computer readable medium comprising program code that, when executed by a processor of a device, causes the device to:

partition, based on a time gap, a set of configuration management (CM) data for one or more cellular network devices into multiple distinct time intervals, wherein the time gap is included in the set of CM data and identified based on a status of a cell to which the one or more cellular network devices belong;

determine one or more temporal points of interest in each time interval based on whether CM changes exist during that time interval;

for each temporal point of interest in each time interval:

identify a first set of data samples before that temporal point of interest and a second set of data samples after that temporal point of interest; and average features and a target key performance indicator (KPI) in the first set of data samples and in the second set of data samples; and perform regression analysis to determine an impact of the features on the target KPI.

16. The non-transitory computer readable medium of claim 15, wherein the program code further causes the device to:

calculate a performance score indicating an improvement or a degradation in the target KPI; and output the performance score.

17. The non-transitory computer readable medium of claim 15, wherein the set of CM data is partitioned into the multiple distinct time intervals such that each time interval does not include time gaps of no data that are longer than a predetermined threshold period.

18. The non-transitory computer readable medium of claim 15, wherein the program code to determine the one or more temporal points of interest in each time interval based on whether or not CM changes exist during that time interval comprises program code to:

for a time interval that has no CM change, select a midpoint of that time interval as a temporal point of interest; and for a time interval that has at least one CM change, select a time coinciding with each of the at least one CM change as a temporal point of interest.

19. The non-transitory computer readable medium of claim 15, wherein the program code further causes the device to:

perform at least one of multiple data preprocessing operations on the set of CM data, the multiple data preprocessing operations comprising (i) removing invalid data samples, (ii) normalizing or scaling the CM data, (iii) removing trends or seasonality in the CM data, (iv) generating additional synthetic features from existing KPIs in the CM data, and (v) selecting a subset of the CM data associated with a specific timeframe or a specific group of the cellular network devices.

20. The non-transitory computer readable medium of claim 15, wherein the target KPI comprises a packet loss rate.

* * * * *